(12) United States Patent
Ming

(10) Patent No.: US 7,978,366 B2
(45) Date of Patent: Jul. 12, 2011

(54) METHOD FOR COMPENSATING FOR COLOR VARIATIONS AMONG MULTIPLE PRINTERS

(75) Inventor: Wei Ming, Cupertino, CA (US)

(73) Assignee: Konica Minolta Systems Laboratory, Inc., San Mateo, CA (US)

( * ) Notice: Subject to any disclaimer, the term of this patent is extended or adjusted under 35 U.S.C. 154(b) by 767 days.

(21) Appl. No.: 11/953,038

(22) Filed: Dec. 8, 2007

(65) Prior Publication Data

US 2009/0147279 A1 Jun. 11, 2009

(51) Int. Cl.
*H04N 1/40* (2006.01)
(52) U.S. Cl. ......... 358/1.9; 358/504; 358/518; 358/523; 358/524; 358/3.23
(58) Field of Classification Search .................. 358/1.9, 358/3.23, 3.24, 504, 518, 523, 524; 382/162, 382/167
See application file for complete search history.

(56) References Cited

U.S. PATENT DOCUMENTS

| | | | | |
|---|---|---|---|---|
| 6,324,975 | B1 * | 12/2001 | Kondo | 101/171 |
| 6,628,826 | B1 * | 9/2003 | Gilman et al. | 382/167 |
| 6,979,069 | B2 * | 12/2005 | Tamagawa | 347/15 |
| 7,221,465 | B1 | 5/2007 | Shimada | |
| 2003/0107772 | A1 * | 6/2003 | Shimazaki et al. | 358/1.9 |
| 2003/0165267 | A1 * | 9/2003 | Tamagawa | 382/167 |
| 2004/0061740 | A1 * | 4/2004 | Tamagawa | 347/43 |
| 2004/0184658 | A1 * | 9/2004 | Inoue | 382/162 |
| 2005/0052668 | A1 * | 3/2005 | Hoshino | 358/1.9 |
| 2008/0074686 | A1 * | 3/2008 | Naito et al. | 358/1.9 |
| 2008/0074687 | A1 * | 3/2008 | Upton | 358/1.9 |
| 2008/0144114 | A1 * | 6/2008 | Woolfe et al. | 358/3.24 |
| 2009/0180127 | A1 * | 7/2009 | Yabe | 358/1.9 |
| 2010/0177366 | A1 * | 7/2010 | Mestha et al. | 358/518 |

OTHER PUBLICATIONS

Windows Color System—WCS Color Device Model Profile Schema and Algorithms, Microsoft Corporation, 2007, http://msdn2.microsoft.com/en-us/library/ms536898(d=printer).aspx, printed from the Internet on Oct. 12, 2007.
Windows Color System—Using The Color Mapping Process with WCS, Microsoft Corporation, 2007, http://msdn2.microsoft.com/en-us/library/ms536819(d=printer).aspx, printed from the Internet on Oct. 12, 2007.
Windows Color System—Using Color Management Modules (CMM), Microsoft Corporation, 2007, http://msdn2.microsoft.com/en-us/library/ms536588(d=printer).aspx, printed from the Internet on Oct. 12, 2007.

(Continued)

*Primary Examiner* — Kimberly A Williams
(74) *Attorney, Agent, or Firm* — Chen Yoshimura LLP

(57) ABSTRACT

A method for compensating for color variations among multiple user printers by providing a target simulation process in each user printer that modifies its default color characteristics so that it has the same color characteristics as a designated target printer. In a WCS implementation, a target CDMP and a user CDMP representing color characteristics of the target printer and the user printer, respectively, are stored and used by the WCS workflow to perform color conversion when printing an image on the user printer. In an ICC implementation, a color simulation profile is generated that matches the color characteristics of the user printer to those of the target printer. The color simulation profile is combined with the default color profile of the printer to generate a combined color profile which is used to perform color conversion when printing an image on the user printer.

6 Claims, 3 Drawing Sheets

OTHER PUBLICATIONS

Windows Color System—WCS Transform Creation Algorithms, Microsoft Corporation, 2007, http://msdn2.microsoft.com/en-us/library/aa364807(d=printer).aspx, printed from the Internet on Nov. 19, 2007.

Windows Color System—CreateMultiProfileTransform, Microsoft Corporation, 2007, http://msdn2.microsoft.com/en-us/library/ms536799(d=printer).aspx, printed from the Internet on Nov. 25, 2007.

* cited by examiner

METHOD FOR COMPENSATING FOR COLOR VARIATIONS AMONG MULTIPLE PRINTERS

BACKGROUND OF THE INVENTION

1. Field of the Invention

This invention relates to a printing method, and in particular, it relates to a printing method that compensate for color variations among multiple printers.

2. Description of Related Art

Color printers of different models from the same or different manufactures often have different color characteristics. Even printers of the same model can have different color characteristics due to various hardware related factors and environment conditions. As a result, the same digital image data can result in slightly different colors on printed pages when printed by different printers. Such color variation among different printers may present problems in certain situations. For example, in a print shop that has a number of printers, it is often desirable to ensure that pages printed by different printers have the same color characteristics. This is especially the case when the print shop produces a print job having a large number of copies by printing them on multiple printers. It would be highly desirable that all copies printed from different printers have the same colors.

SUMMARY

The present invention is directed to a method and related apparatus for compensating for color variations among multiple printers.

An object of the present invention is to enable multiple printers to generate printed pages with reduced color variations.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for printing color images by a user printer using a WCS color management system with reduced color variation between the user printer and a designated target printer, which includes: (a) obtaining a target color device model profile representing color characteristics of the target printer; (b) obtaining a user color device model profile representing color characteristics of the user printer; (c) storing the target color device model profile and the user color device model profile in the user printer; and (d) when printing an image from input digital image data using the user printer, performing color conversion using the target color device model profile and the user color device model profile. The color conversion may further use a color device model profile of the input image, or further use a color device model profile of the input image and a default color device model profile of the user printer.

In another aspect, the present invention provides a method for printing color images by a user printer with reduced color variation between the user printer and a designated target printer, which includes: (a) obtaining target color measurement values representing color characteristics of the target printer; (b) obtaining user color measurement values representing color characteristics of the user printer; (c) generating a target simulation profile based on the target color measurement values and user color measurement values, the target simulation profile representing a matching of the color characteristics of the user printer to the color characteristics of the target printer; (d) generating a combined color profile of the user printer by combining a default color profile of the user printer and the target simulation profile; and (e) when printing an image from digital image data using the user printer, performing color conversion using the combined color profile.

In another aspect, the present invention provides a printer which includes: a print engine; and a controller for processing digital image data to be printed and controlling the print engine, the controller including a processor and a memory, wherein the memory stores a target color device model profile and a user color device model profile, the target color device model profile having been generated by printing a first color measurement chart by a designated target printer, measuring the first color measurement chart to obtain target color measurement values, and generating the target color device model profile using the target color measurement values, the user color device model profile having been generated by printing a second color measurement chart by the printer, the second color measurement chart corresponding to the first color measurement chart, measuring the second color measurement chart to obtain user color measurement values, and generating the user color device model profile using the user color measurement values, and wherein the processor is programmed to carry out, when printing an image from input digital image data, a color conversion process using the target color device model profile and the user color device model profile.

In another aspect, the present invention provides a printer which includes: a print engine; and a controller for processing digital image data to be printed and controlling the print engine, the controller including a processor and a memory, wherein the memory stores a combined color profile, the combined color profile having been generated by printing a first color measurement chart by a designated target printer using a default color profile of the target printer, measuring the first color measurement chart to obtain target color measurement values representing color characteristics of the target printer, printing a second color measurement chart by the printer using a default color profile of the printer, the second color measurement chart corresponding to the first color measurement chart, measuring the second color measurement chart to obtain user color measurement values representing color characteristics of the printer, generating a target simulation profile based on the target color measurement values and user color measurement values, the target simulation profile representing a matching of the color characteristics of the printer to the color characteristics of the target printer, and generating the combined color profile by combining a default color profile of the user printer and the target simulation profile, and wherein the processor is programmed to carry out a color conversion process using the combined color profile when printing an image from digital image data.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method for compensating for color variations among multiple printers by providing a target simulation process in each printer. The target simulation process modifies the default color characteristics of each printer so that the printers will have the same color characteristics as a target printer. In other words, after the modification, the same digital image data will produce printed pages having the same colors when printed by the modified printer and the target printer. Two embodiments are described. The first embodiment may be implemented on printers that employ the WCS (Windows Color System) color management scheme; the second embodiment may be implanted on printers that employ the ICC (International Color Consortium) color management scheme. The WCS scheme is currently used by the Windows Vista™ operating system and the ICC scheme is currently used by most other operating systems. Both methods may be practiced in a print shop or any establishment that employs multiple color printers. The term printer as used in this disclosure should be understood to broadly cover any machine that has a printing function, including all-in-one (AIO) machines that have scanning, printing and copying (sometimes referred to as multi-function machines).

Figures 1, 2:
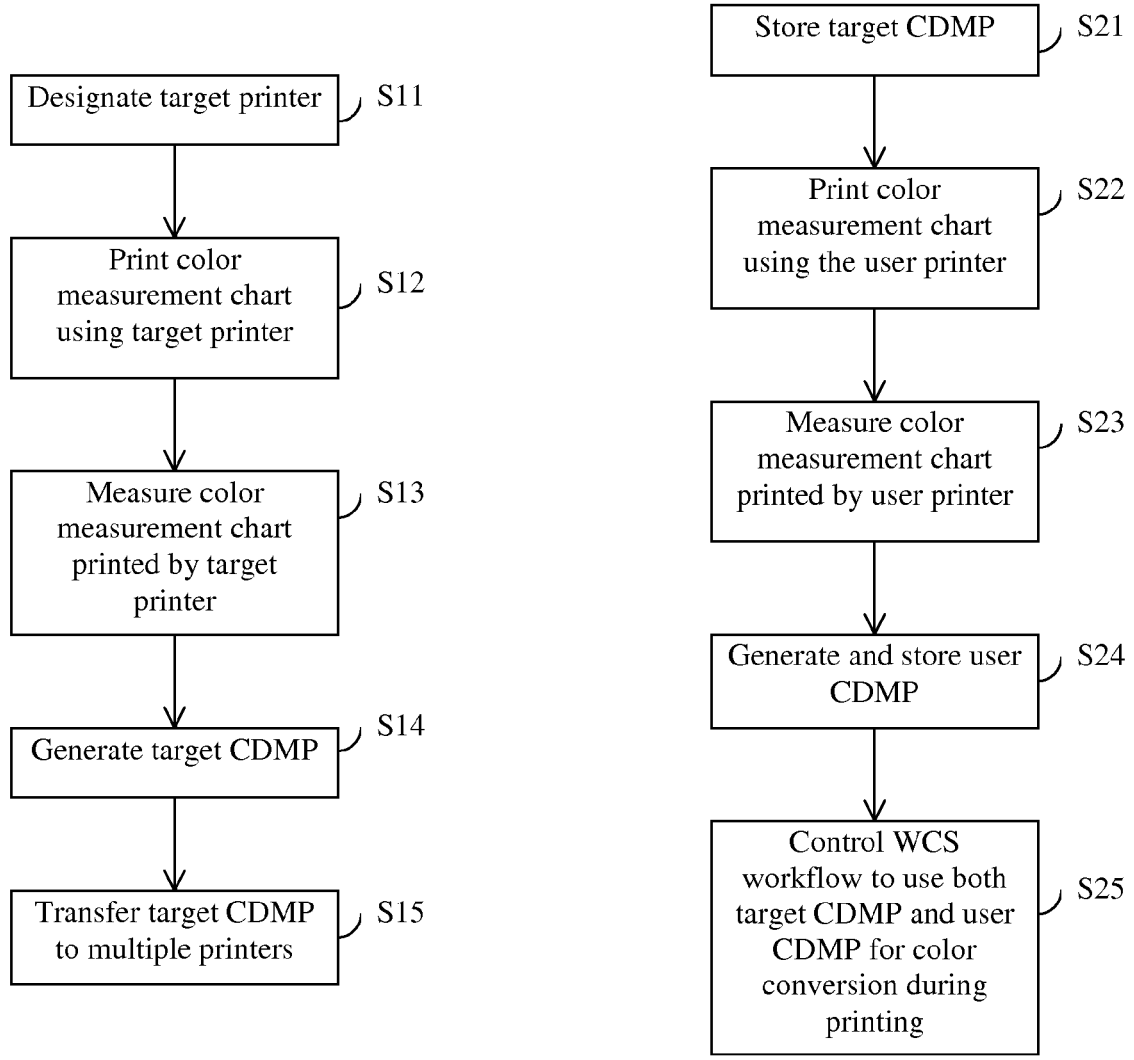
FIGS. 1 and 2 illustrate a method for compensating for color variations among multiple printers according to a first embodiment of the present invention.

FIGS. 1 and 2 illustrate a method according to the first embodiment of the present invention. Prior to performing the steps shown in FIGS. 1 and 2, an optional printer and controller calibration step is performed for each of the multiple printers. This step is desirable in many situations, as print quality may change due to temperature, humidity, use over time and so on. Calibration or re-calibration will help to reduce undesirable effects due to such drifts.

One of the multiple printers is then designated as a target printer (step S11). For convenience, the other ones of the multiple printers are referred to as user printers in this disclosure. Alternatively, the target printer may be a printer outside of the multiple printers. A color measurement chart is printed using the target printer with its default color profile (step S12). A color measurement chart is a chart that includes a large number of color patches of various colors, each patch corresponding to an input color value (e.g. CMYK color value). The default color profile of a printer is a color profile used by the printer in the normal printing process (prior to any modification according to embodiments of the present invention); they may be provided by the manufacture or generated by the user and pre-stored in the printer. The color measurement chart printed by the target printer is measured to obtain the color values for the color patches (referred to as target color measurement values) (step S13). Preferably, a special purpose spectrophotometer for measuring printed colors is used for this measurement, but other suitable apparatus, such as a general purpose spectrophotometer (e.g. CM-2600d available from Konica Minolta Sensing America, Inc.), a colorimeter (e.g. CR-400 available from Konica Minolta Sensing America, Inc.) may be used as well. A color device model profile (CDMP), called a target CDMP or target.cdmp in this example, is generated from the target color measurement values (step S14). CDMP is a file format employed by WCS to specify color device model profiles. A CDMP file stores measurement data that can be used by WCS device models to instantiate a model that relates device color space coordinates to a device independent color space, e.g. CIEXYZ. The target CDMP is transferred to each user printer (step S15), e.g., using a network or a storage device. Preferably, the target CDMP file is generated before it is transferred to the user printers, but it is also possible to transfer the raw target color measurement values to each printer which then generates the target CDMP file.

The steps shown in FIG. 2 are performed on each user printer. First, the target CDMP file is stored in the user printer (step S21). A color measurement chart is printed using the user printer with its default color profile (step S22), and the color values of the chart are measured to obtain color values for the color patches (referred to as user color measurement values) (step S23). The color measurement chart printed by the user printer corresponds to the color measurement chart printed by the target printer in step S12, meaning the input digital color values for the corresponding color patches in the two charts are the same. In other words, the corresponding color patches in the two printed charts would have the same colors if there were no color variation between the target printer and the user printer under their respective default color profiles. A device color model profile for the user printer, called a user CDMP or user.cdmp in this example, is generated from the user color measurement values and stored in the printer (step S24).

When using the user printer to print a color image from digital image data, the WCS workflow on the user printer is modified so that the target CDMP and the user CDMP, in addition to the default color profiles of the user printer, are used for color conversion (step S25). This may be accomplished by providing a customized control process using the APIs provided by WCS. More specifically, the customized control process first calls a CDMP of the input image and the default CDMP of the user printer to convert the image from the color space of the input image (e.g. sRGB) to the gamut of the user printer device. The control process then calls the target CDMP and the user CDMP to perform color conversion from the gamut of the target printer to the gamut of the user printer. The actual color conversion process is handled by WCS. According to documentation available from Microsoft (see, e.g., Using The Color Mapping Process with WCS, http://msdn2.microsoft.com/en-us/library/ms536819.aspx), the color conversion process may be performed by first converting colors from the gamut of the target device (here, for example, the target printer) to a device independent color space, and then converting the color from the device independent color space to the gamut of the destination device (here, for example, the user printer).

As a result of adding the steps of calling the target CDMP and the user CDMP, an image printed by the user printer will have colors that are substantially the same as an image printed by the target printer from the same input digital data. The details of implementing the modified WCS workflow are not described here as they can be readily learned by those skilled in the art by referring to existing WCS documentations or through routine experimentation.

An alternative implementation of the method of FIGS. 1 and 2 is to replace the default color profile of the user printer (i.e. the default color profile that accomplishes the rgb to cmyk transform) with a single color transform, in which multiple CDMP profiles are included, to simulate the color characteristics of the target printer directly. In this alternative method, in steps S12 and S22, the color measurements charts are printed on the target printer and the user printer under the condition where color management function of the printers are turned OFF. In other words, the default color profile of the target printer and the user printer, respectively, are not used when printing the color measurements charts. Steps S13 to S15, S23 and S24 are not changed, and the CDMP files for target and user printer (target.cdmp and user.cdmp) are created from the color measurement charts. Then, step S25 can be implemented by a control process that includes the following API as an example:

HTRANSFORM WINAPI CreateMultiProfileTransform(
    PHPROFILE pahProfiles,
    DWORD nProfiles,
    PDWORD padwIntent,
    DWORD nIntents,
    DWORD dwFlags,
    DWORD indexPreferredCMM
);

Here, pahProfiles is the pointer to an array of handles to the profiles to be used, and nProfiles specifies the number of profiles in the array. In the instant case, if embedded CAMP and GMMP profiles are used, nProfiles is 3. pahProfiles includes three CDMP profiles in the order of wsRGB.cdmp (a CDMP of the input image), target.cdmp and user.cdmp. The definition of the other parameters is described in documentations provided by Microsoft available at http://msdn2.microsoft.com/en-us/library/ms536799.aspx. It should be noted that among the other parameters of the API, for those that correspond to the wsRGB.cdmp and target.cdmp (e.g. the Intents for the input image and the target), the values (including plugins) to be used when calling the API on the user printer should be the same values that are used in the target printer. One way to accomplish this is to use the factory default values for these parameters since they are the same on the target printer and user printer. Another way to accomplish this is to actually transfer the values (e.g. the Intent and its associated GMMP, Plugin, CAMP, and so on) from the target printer to the user printer beforehand so that they can be used when calling the API on the user printer.

In the method shown in FIGS. 1 and 2, steps S11 to S15 and S21 to S24 are performed once, and may be repeated from time to time, while steps S25 is performed each time an image is printed on a user printer. The printing method on the target printer is unchanged, i.e., the default color profiles are used in color conversion.

Figure 3:
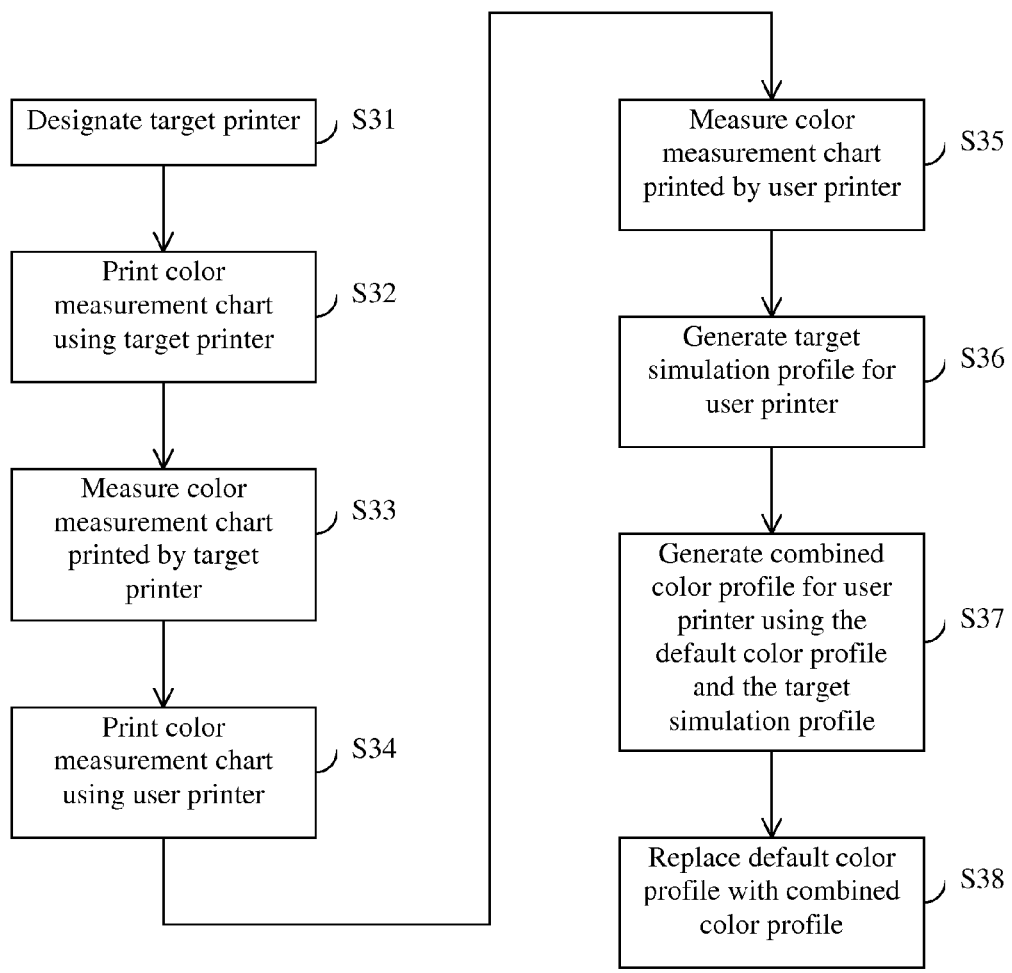
FIG. 3 illustrate a method for compensating for color variations among multiple printers according to a second embodiment of the present invention.

FIG. 3 illustrates a method according to the second embodiment of the present invention implanted on printers that employ the ICC color management scheme. Similar to the first embodiment, an optional printer and controller calibration step is performed first for the multiple printers. Then, one of the multiple printers is designated as a target printer (step S31). Alternatively, the target printer may be a printer outside of the multiple printers being modified. Then, color measurement charts are printed using the target printer (step S32) and measured to obtain the color values for the color patches (the target color measurement values) (step S33). Similarly, a corresponding color measurement chart is printed using each user printer (step S34) and measured to obtain color values for the color patches (the user color measurement values) (step S35). In steps S32 and S34, the charts are printed by using the default color profiles of the respective printers. Based on the target color measurement values and the user color measurement values, a target simulation profile is generated for each user printer (step S36). In the ICC color management scheme, a color profile is a mapping between two sets of color values, and may be in the form of a lookup table or a matrix. The target simulation profile generated in step S36 represents a matching of the color characteristics of the user printer to the color characteristics of the target printer. The target simulation profile may be generated by using software a utility commonly referred to as a profile maker, which can generate the profile when given then two sets of color measurement values. This step may be carried out on any computer. The target simulation profile is then combined with the default color profile of the user printer to generate a combined color profile for each user printer (step S37). If the color profiles are in the lookup table form, the combination may be done by generating a lookup table that gives the same result as carrying out the two lookup processes in sequence. The combined color profile is stored in the respective user printer and replaces the default color profile of that printer (step S38). Digital images are printed by the user printer in the conventional way, the default color profile having been replaced by the combined color profile.

Implementations of the invention under the WCS and ICC color management schemes are described above. The invention may be similarly implemented under other color management schemes.

Figure 4:
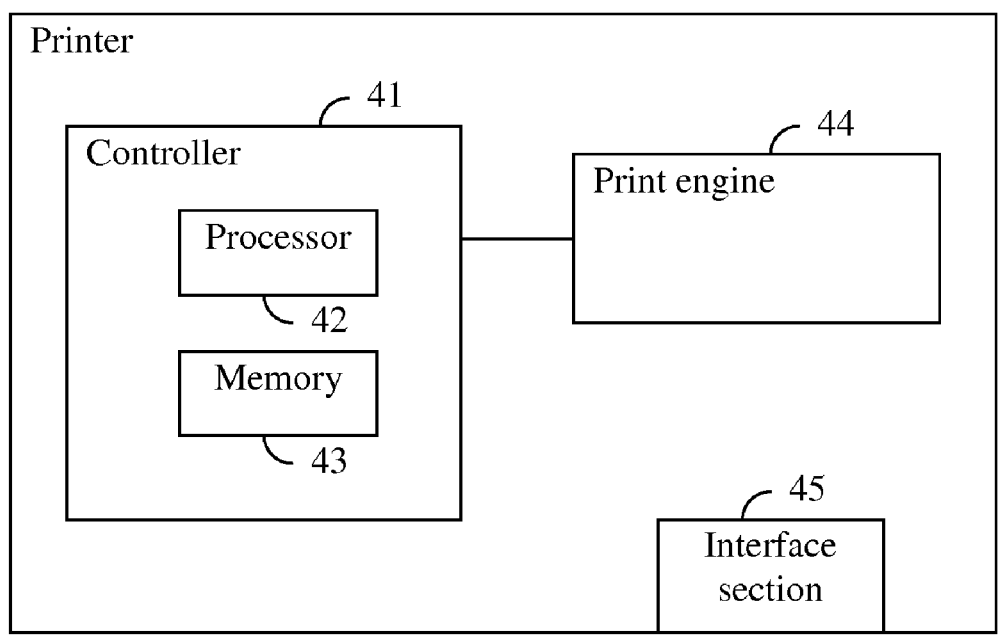
FIG. 4 schematically illustrates a printer on which a printing method according to embodiments of the present invention may be implemented.

FIG. 4 is a schematic block diagram of a printer in which methods according to embodiments of the present invention may be implemented. The printer includes a controller 41 which includes a processor 42 and a memory 43, and a print engine 44. Other portions of the printer are not shown. The memory 43 stores the various color profiles, including the target CDMP and user CDMP files when implementing the first embodiment under a WCS scheme, and the combined color profile when implementing the second embodiment under an ICC scheme. The processor 42 performs image processing, including various color conversion processes according to embodiments of the present invention.

It will be apparent to those skilled in the art that various modification and variations can be made in the color variation compensation method and apparatus of the present invention without departing from the spirit or scope of the invention. Thus, it is intended that the present invention cover modifications and variations that come within the scope of the appended claims and their equivalents.

What is claimed is:

1. A method for printing color images by a user printer using a WCS color management system with reduced color variation between the user printer and a designated target printer, the method comprising:
(a) obtaining a target color device model profile representing color characteristics of the target printer, the target color device model profile containing color measurement data to be used to instantiate a model that relates target printer color space coordinates to a device independent color space;
(b) obtaining a user color device model profile representing color characteristics of the user printer, the user color device model profile containing color measurement data to be used to instantiate a model that relates user printer color space coordinates to the device independent color space;
(c) storing the target color device model profile and the user color device model profile in the user printer; and
(d) when printing an image from input digital image data using the user printer, performing color conversion using the target color device model profile and the user color device model profile.

2. The method of claim 1, wherein step (a) includes:
(a1) printing a first color measurement chart by the target printer using a default color device model profile of the target printer;
(a2) measuring the first color measurement chart printed in step (a1) to obtain target color measurement values; and
(a3) generating the target color device model profile using the target color measurement values;

wherein step (b) includes:
- (b1) printing a second color measurement chart by the user printer using a default color device model profile of the user printer, the second color measurement chart corresponding to the first color measurement chart;
- (b2) measuring the second color measurement chart printed in step (b1) to obtain user color measurement values; and
- (b3) generating the user color device model profile using the user color measurement values; and wherein the color conversion in step (d) further uses a color device model profile of the input image and the default color device model profile of the user printer.

3. The method of claim 1, wherein step (a) includes:
- (a1) printing a first color measurement chart by the target printer with its color management function turned OFF;
- (a2) measuring the first color measurement chart printed in step (a1) to obtain target color measurement values; and
- (a3) generating the target color device model profile using the target color measurement values;

wherein step (b) includes:
- (b1) printing a second color measurement chart by the user printer with its color management function turned OFF, the second color measurement chart corresponding to the first color measurement chart;
- (b2) measuring the second color measurement chart printed in step (b1) to obtain user color measurement values; and
- (b3) generating the user color device model profile using the user color measurement values; and wherein the color conversion in step (d) further uses a color device model profile of the input image.

4. A printer, comprising:
a print engine; and
a controller for processing digital image data to be printed and controlling the print engine, the controller including a processor and a memory,
wherein the memory stores a target color device model profile and a user color device model profile,
the target color device model profile having been generated by printing a first color measurement chart by a designated target printer, measuring the first color measurement chart to obtain target color measurement values, and generating the target color device model profile using the target color measurement values, wherein the target color device model profile contains color measurement data to be used to instantiate a model that relates target printer color space coordinates to a device independent color space,
the user color device model profile having been generated by printing a second color measurement chart by the printer, the second color measurement chart corresponding to the first color measurement chart, measuring the second color measurement chart to obtain user color measurement values, and generating the user color device model profile using the user color measurement values, wherein the user color device model profile contains color measurement data to be used to instantiate a model that relates user printer color space coordinates to the device independent color space, and
wherein the processor is programmed to carry out, when printing an image from input digital image data, a color conversion process using the target color device model profile and the user color device model profile.

5. The printer of claim 4,
wherein the first color measurement chart is printed by the target printer with its color management function turned OFF,
wherein the second color measurement chart is printed by the printer with its color management function turned OFF, and
wherein the color conversion process further uses a color device model profile of the input image.

6. A printer, comprising:
a print engine; and
a controller for processing digital image data to be printed and controlling the print engine, the controller including a processor and a memory,
wherein the memory stores a target color device model profile and a user color device model profile,
the target color device model profile having been generated by printing a first color measurement chart by a designated target printer, measuring the first color measurement chart to obtain target color measurement values, and generating the target color device model profile using the target color measurement values,
the user color device model profile having been generated by printing a second color measurement chart by the printer, the second color measurement chart corresponding to the first color measurement chart, measuring the second color measurement chart to obtain user color measurement values, and generating the user color device model profile using the user color measurement values,
wherein the processor is programmed to carry out, when printing an image from input digital image data, a color conversion process using the target color device model profile and the user color device model profile,
wherein the first color measurement chart is printed by the target printer using a default color profile of the target printer,
wherein the second color measurement chart is printed by the printer using a default color profile of the printer,
wherein the memory further stores the default color profile of the printer, and
wherein the color conversion process further uses a color device model profile of the input image and the default color profile of the user printer.

* * * * *